United States Patent
Zuili

(10) Patent No.: US 7,953,667 B1
(45) Date of Patent: *May 31, 2011

(54) METHOD AND SYSTEM TO DETECT INVALID AND FRAUDULENT IMPRESSIONS AND CLICKS IN WEB-BASED ADVERTISEMENT SYSTEMS

(75) Inventor: Patrick Zuili, Boca Raton, FL (US)

(73) Assignee: Britesmart Corp., Boca Raton, FL (US)

( * ) Notice: Subject to any disclaimer, the term of this patent is extended or adjusted under 35 U.S.C. 154(b) by 731 days.

This patent is subject to a terminal disclaimer.

(21) Appl. No.: 11/781,716

(22) Filed: Jul. 23, 2007

Related U.S. Application Data

(63) Continuation-in-part of application No. 10/360,688, filed on Feb. 7, 2003, now Pat. No. 7,249,104.

(51) Int. Cl.
*G06F 21/00* (2006.01)

(52) U.S. Cl. .......................................................... 705/52

(58) Field of Classification Search .............. 705/26–27, 705/52–54, 64–67, 75–78; 713/168–169; 707/705–788; 726/1–5, 26–30
See application file for complete search history.

(56) References Cited

U.S. PATENT DOCUMENTS

| | | | |
|---|---|---|---|
| 5,848,396 A | 12/1998 | Gerace | |
| 5,991,740 A | 11/1999 | Messer | |
| 6,125,352 A | 9/2000 | Franklin et al. | |
| 6,285,987 B1 | 9/2001 | Roth et al. | |
| 6,775,831 B1 | 8/2004 | Carrasco et al. | |
| 7,020,622 B1 | 3/2006 | Messer | |
| 7,043,471 B2 | 5/2006 | Cheung et al. | |
| 7,136,860 B2 | 11/2006 | Doliov | |
| 2001/0007097 A1 | 7/2001 | Kim | |
| 2001/0037314 A1 | 11/2001 | Ishikawa | |
| 2003/0216930 A1 | 11/2003 | Dunham et al. | |
| 2006/0041505 A1* | 2/2006 | Enyart | 705/40 |

OTHER PUBLICATIONS

Mulhall, "How Real a Threat Does Computer Crime Represent?", Aug. 1, 1996, Computer Fraud & Security Bulletin.*

(Continued)

*Primary Examiner* — Mary Cheung
(74) *Attorney, Agent, or Firm* — John R. Kasha; Kasha Law LLC

(57) ABSTRACT

This invention improves upon existing pay-per-click arrangements periodically generating a code associated with the search-engine users. This code, preferably in the form of a serial number, is compared to the user of the website, such that by observing a metric like the number of clicks for a given period of time, be it a short time or a longer period, such as a day or a week, the system can automatically determine if certain clicks are illegitimate. This allows the pay-per-click company to more fairly invoice the merchants, thereby preventing fraudulent over use.

26 Claims, 1 Drawing Sheet

OTHER PUBLICATIONS

Anupam, Vinod, et al., On the Security of pay-per-click and other Web advertising schemes, Computer Networks 31 (1999)1091-1100.

Jakobsson, Markus, et al., Secure and lightweight advertising on the Web, Computer Networks 31 (1999) 1101-1109.

Sherman, Chris, Ask the Search Engine: Coping with Fraudulent Pay-Per-Click Traffic, Apr. 18, 2002.

Blundo, Carlo, et al, SAWM: A Tool for Secure and Authenticated Web Metering, SEKE 2002, Jul. 15-19, Ischia, Italy.

Who's Clicking Who? Membership Details, http://web.archive.org/web/20020907125231/www.whosclikcingwho.com/auditor.html.

NY Internet World Convention, Lycos InSite Adbuyer Program, Click Fraud, http://web.archive.org/web/20021204202939/www.submitexpress.com.

Who'sClickingWho?.com, Pay-Per-Click Auditing Service, WCWReporter PPC Traffic Audit Report, http://web.archive.org/web/20021224105335/www/whosclickingwho.com/wcwreporter.

Tuzhilin, Alexander, The Lane's Gift v. Google Report.

* cited by examiner

METHOD AND SYSTEM TO DETECT INVALID AND FRAUDULENT IMPRESSIONS AND CLICKS IN WEB-BASED ADVERTISEMENT SYSTEMS

CROSS REFERENCE TO RELATED APPLICATION

This application is a continuation-in-part of U.S. patent application Ser. No. 10/360,688, entitled "Pay-per-click system and method that determine whether a requested link to a merchant website is legitimate or fraudulent" filed Feb. 7, 2003, now U.S. Pat. No. 7,249,104 and naming as inventors Patrick Zuili, which is incorporated by reference in its entirety for all purposes as if completely and fully set forth herein.

FIELD OF THE INVENTION

This invention relates generally to network computing of the type which occurs over the Internet, for example, and, more particularly, to a method of protecting the providers of pay-per-click services from multiple illegitimate usages.

BACKGROUND OF THE INVENTION

Over the last few years in particular, the capabilities of the Internet have grown dramatically, with the introduction of new protocols (i.e., XML), advanced browsers, electronic commerce capabilities, and other features.

Numerous commercial enterprises are now attempting to somehow profit through this new infrastructure, in many cases by providing services that attach a smaller incremental monetary value to a particular transaction.

One such type of capability is the pay-per-click search engine popularized by Google and other companies. In accordance with such a capability, a user goes to a website, and inputs the name of goods or services that they would like the pay-per-click company to find. Various providers of goods and services register their websites with the company, and these are provided to the user in a list which is prioritized by the level of compensation which the merchant will give the pay-per-click company if the user is routed to their site. For example, using such a system, if a user types in "binoculars," the pay-per-click system might return five potential links, with the most prominent one being associated with that supplier of binoculars which will compensate for a penny or a few cents more than the links presented below.

One problem with existing systems, is that a user may cause an undesirable level of expenditure on the part of the merchant by overclicking on a particular link. In some cases, it has been known that some users have done this simply for the purpose of undermining a particular provider or competitor. Since the existing systems have no way of knowing whether a link through is legitimate or bogus, the provider of the goods/services winds up having to pay the pay-per-click provider excess sums, with the fraudulent perpetrator remaining unreprimanded.

SUMMARY OF THE INVENTION

This invention improves upon existing pay-per-click arrangements periodically generating a code associated with the search-engine users. This code, preferably in the form of a serial number, is compared to the user of the website, such that by observing a metric like the number of clicks for a given period of time, be it a short time or a longer period, such as a day or a week, the system can automatically determine if certain clicks are illegitimate. This allows the pay-per-click company to more fairly invoice the merchants, thereby preventing fraudulent over use.

DETAILED DESCRIPTION OF THE INVENTION

Figure 1:
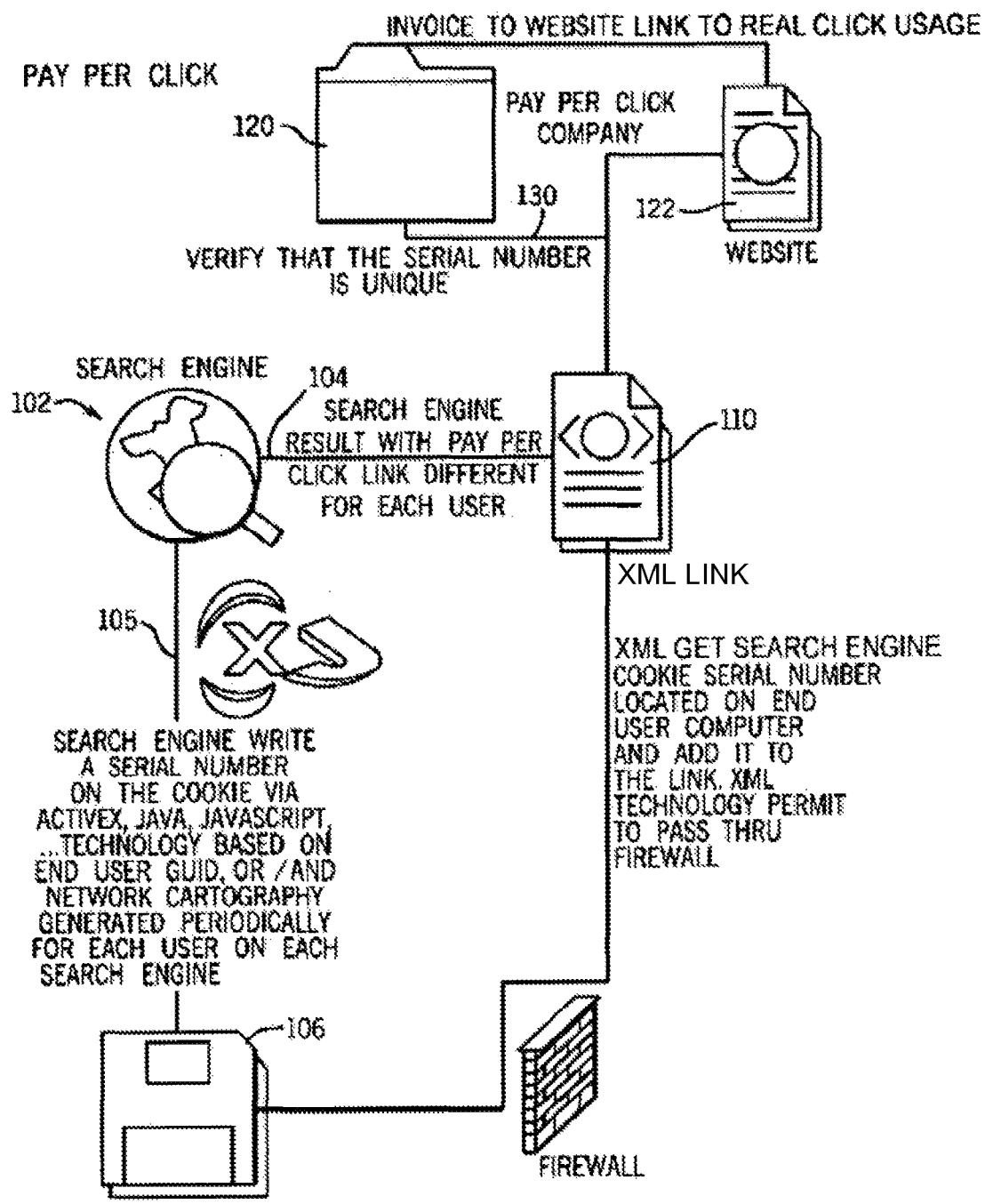
FIG. 1 is a diagram which illustrates a per-per-click system incorporating a preferred embodiment of the present invention.

Reference is made to FIG. 1 which illustrates a typical configuration associated with a pay-per-click implementation. It is noted that although the diagram includes certain interconnected graphical blocks, these are not taken to mean "hardware" or "software," but may include any combination of hardware/software necessary to implement a particular function. In addition, although lines are drawn between the various components, this is not meant to imply that they are necessarily implemented in close proximity to one another, since in many cases these capabilities will be remote.

The search engine 102 provides a result along path 104 which is indicative of a link associated with different users. Engine 102 may be any existing or yet-to-be-developed system, including findwhat.com, Google Adwords, overture, looksmart.com, kanoodle.com, and so forth.

In addition to the result generated along path 104, according to this invention, the search engine generates a code, preferably in the form of a serial number utilizing a cookie via active X, Java, Javascript, or any other type of technology based upon the end-user's Global Unique Identifier (GUID). In addition, or as an alternative, network cartography may be generated periodically for each user based upon their use of the search engine 102.

Although the encoded serial number is shown being written to a floppy disk 106, again, it will be appreciated by those of skill in the art that any type of storage capability, such as a flash memory, and so forth may alternatively be utilized. The code (e.g., a serial number) generated by the search engine along path 105 is concatenated with the result along path 104 through XML link 110. Given the serial number provided through the cookie, this allows the concatenation to occur through firewalls and other devices which may otherwise block the transmission as unauthorized.

As the pay-per-click company 120, information is received regarding a click to website 122, but at the same time, the serial number is transmitted to the company 120 along path 130. This allows the pay-per-click company 120 to invoice the website 122 only when the serial numbers received. According to the invention, a legitimate serial number may be generated in different ways, including the first use of a different user having a unique IP address, or, if multiple requests are made by the same user, they may be considered legitimate if they are sufficiently spaced apart in time to be indicative of a legitimate as opposed to fraudulent access to the website 122.

What is claimed is:
1. A method for detecting fraudulent activity in a pay-per-click system, comprising:
   (a) providing a search engine on a server side;
   b) receiving, at said server side, a search request from a client;
   c) generating a unique code on the server side, for identifying said client;

d) transmitting said code to said client from the server side;
e) transmitting to said client from the server side, in response to said search request, a plurality of links associated with a plurality of websites associated with a plurality of merchants;
f) generating website information regarding a website selected by the client when said client clicks one of said plurality of links;
g) transmitting said code and said website information together from said client to said server side;
h) receiving said code and said website information at the server side, and detecting fraudulent activity by measuring the duration between clicks by said client to said selected website by examining said code and website information.

2. A method for detecting fraudulent activity in a pay-per-click system as in claim 1 further comprising the step of:
storing said code at said client.

3. A method for detecting fraudulent activity in a pay-per-click system as in claim 1 further comprising the step of:
storing said code in a cookie.

4. A method for detecting fraudulent activity in a pay-per-click system as in claim 3 wherein said storing step is performed using at least one of the following: active, Java, and Javascript.

5. A method for detecting fraudulent activity in a pay-per-click system as in claim 1 further comprising the step of:
concatenating said code with at least one of said links to said websites.

6. A method for detecting fraudulent activity in a pay-per-click system as in claim 1 wherein said code is based on a global unique identifier of said client.

7. A method for detecting fraudulent activity in a pay-per-click system as in claim 1 wherein said code is based on a network cartography of said client.

8. A method for detecting fraudulent activity in a pay-per-click system as in claim 1 wherein said code is a serial number.

9. A method for detecting fraudulent activity in a pay-per-click system as in claim 1 further comprising the step of:
preventing a click-through to at least one of said websites associated with merchants if fraudulent activity is detected.

10. In an advertising system including a search engine on a server side, the search engine providing a plurality of links associated with a plurality of web pages to a user at a device on a client side, the method for identifying fraud comprising the steps of:
generating a code on the server side, the code identifying said device on the client side;
sending said code to said device;
receiving data from said device, said data including said code and information about one or more selections by the user of at least one of said plurality of web pages;
determining from said data whether said at least one of said selections of said at least one web page is fraudulent; and
examining a duration between a time of one of said selections of said at least one web site and a time of another of said selections of said at least one web site.

11. In an advertising system including a search engine on a server side, the search engine providing a plurality of links associated with a plurality of web pages to a user at a device on a client side, the method for identifying fraud as in claim 10 wherein said code is based on a global unique identifier of said device.

12. In an advertising system including a search engine on a server side, the search engine providing a plurality of links associated with a plurality of web pages to a user at a device on a client side, the method for identifying fraud as in claim 10 wherein said code is based on a network cartography of said client.

13. In an advertising system including a search engine on a server side, the search engine providing a plurality of links associated with a plurality of web pages to a user at a device on a client side, the method for identifying fraud as in claim 10 wherein said code is a serial number.

14. A method for detecting fraud in an advertising system including a search engine on a server side comprising the steps of:
generating a code on the server side, the code identifying a device on a client side;
generating on the server side, a plurality of links associated with a plurality of web pages in response to a search initiated at the device on the client side wherein at least one of said links includes said code;
sending said plurality of links to the device;
receiving data from said device, said data including said code and information about one or more clicks by the user on at least one of said plurality of links associated with the plurality of web pages;
determining from said data whether said at least one of said clicks on said at least one link is fraudulent; and
examining a duration between a time of one of said clicks on said at least one link and a time of another of said clicks on said at least one link.

15. A method for detecting fraud in an advertising system including a search engine on a server side as in claim 14 wherein said code is based on a global unique identifier of said device.

16. A method for detecting fraud in an advertising system including a search engine on a server side as in claim 14 wherein said code is based on a network cartography of said client.

17. A method for detecting fraud in an advertising system including a search engine on a server side as in claim 14 wherein said code is a serial number.

18. A method for detecting fraudulent activity in a pay-per-click system, comprising:
(a) providing a search engine on a server side;
b) receiving, at said server side, a search request from a client;
c) generating a unique code on the server side, for identifying said client;
d) transmitting said code to said client from the server side;
e) transmitting to said client from the server side, in response to said search request, a plurality of links associated with a plurality of websites associated with a plurality of merchants;
f) receiving, on said server side, website information regarding a website selected by the client together with said code, when said client clicks one of said plurality of links;
g) detecting fraudulent activity by measuring the duration between clicks by said client to said selected website by examining said code and website information.

19. A method for detecting fraudulent activity in a pay-per-click system as in claim 18 further comprising the step of:
storing said code at said client.

20. A method for detecting fraudulent activity in a pay-per-click system as in claim 19 wherein said storing step is performed using at least one of the following: active, Java, and Javascript.

21. A method for detecting fraudulent activity in a pay-per-click system as in claim 18 further comprising the step of:
   storing said code in a cookie.

22. A method for detecting fraudulent activity in a pay-per-click system as in claim 18 further comprising the step of:
   concatenating said code with at least one of said links to said websites.

23. A method for detecting fraudulent activity in a pay-per-click system as in claim 18 wherein said code is based on a global unique identifier of said client.

24. A method for detecting fraudulent activity in a pay-per-click system as in claim 18 wherein said code is based on a network cartography of said client.

25. A method for detecting fraudulent activity in a pay-per-click system as in claim 18 wherein said code is a serial number.

26. A method for detecting fraudulent activity in a pay-per-click system as in claim 18 further comprising the step of:
   preventing a click-through to at least one of said websites associated with merchants if fraudulent activity is detected.

* * * * *

Disclaimer

7,953,667—Patrick Zuili, Boca Raton, FL (US); METHOD AND SYSTEM TO DETECT INVALID AND FRAUDULENT IMPRESSIONS AND CLICKS IN WEB-BASED ADVERTISEMENT SYSTEMS. Patent dated May 31, 2011. Disclaimer filed May 26, 2011, by the Assignee, Britesmart Corp.

The term of this patent, subsequent to the patent number 7,249,104 has been disclaimed.

(*Official Gazette January 24, 2012*)

UNITED STATES PATENT AND TRADEMARK OFFICE
CERTIFICATE OF CORRECTION

PATENT NO. : 7,953,667 B1
APPLICATION NO. : 11/781716
DATED : May 31, 2011
INVENTOR(S) : Patrick Zuili Page 1 of 1

It is certified that error appears in the above-identified patent and that said Letters Patent is hereby corrected as shown below:

Column 2, line 32, "active X" should be change to --ActiveX--.

Column 3, line 25, "active" should be changed to --ActiveX--.

Column 4, line 66, "active" should be changed to --ActiveX--.

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,953,667 B1 | Page 1 of 1 |
| APPLICATION NO. | : 11/781716 | |
| DATED | : May 31, 2011 | |
| INVENTOR(S) | : Patrick Zuili | |

It is certified that error appears in the above-identified patent and that said Letters Patent is hereby corrected as shown below:

In the Claims:

Column 3, line 60, replace "web site" by --web page--.

Column 3, line 61, replace "web site" by --web page--.

Column 4, line 6, replace "client" by --client side--.

Column 4, line 38, replace "client" by --client side--.

Signed and Sealed this
Twelfth Day of August, 2014

Michelle K. Lee
*Deputy Director of the United States Patent and Trademark Office*